United States Patent [19]

Britt et al.

[11] Patent Number: 4,777,638

[45] Date of Patent: Oct. 11, 1988

[54] LASING COMPOSITION

[75] Inventors: Edward J. Britt, Cupertino; Bernard C. F. M. Laskowski, Mountain View; John L. Lawless, Sunnyvale, all of Calif.; William C. Stwalley, Iowa City, Iowa

[73] Assignee: Space Power Incorporated, San Jose, Calif.

[21] Appl. No.: 795,656

[22] Filed: Nov. 6, 1985

[51] Int. Cl.$^4$ ............................................. H01S 3/22
[52] U.S. Cl. ..................................... 372/57; 372/39; 252/301.17
[58] Field of Search ............................ 372/39, 76, 57; 252/301.17

[56] References Cited

PUBLICATIONS

Haueisen et al., "Lyman-$\alpha$ Radiation From Cs—H+ and Na—H+ Charge Transfer Processes with a Plasma Gun", Appl. Phys. Lett. 32 (5), Mar. 1, 78.

Ligare et al; "Laser Induced Fluorescence of CsH ($A'\Sigma^+ \rightarrow X'\Sigma^+$) To Levels Near the Dissociation limit $X'\Sigma^+$", J. Chem. Phys. 76 (7), Apr. 1, 82.

Sorokin et al; "Infrared Lasers Resulting From Photodissociation of $CS_2$ and $Rb_2$"; J. Chem. Phys. 11 (7), Oct. 1, 69.

Primary Examiner—Léon Scott, Jr.
Assistant Examiner—L. Churl
Attorney, Agent, or Firm—Fliesler, Dubb, Meyer & Lovejoy

[57] ABSTRACT

A composition of matter is provided which is capable of producing laser energy on being pumped. The composition comprises a first chemical entity and a second chemical entity, wherein the first and second entities form a charge bearing molecule when excited to a relatively higher energy state and exist as distinct non-associated entities when in a relatively lower energy state. A method of producing laser energy and a laser, utilizing such composition of matter, also form a part of the invention. Generally, at least one of the first and second chemical entities in the charge bearing molecule has a number of electrons substantially equal to the number of electrons of a noble gas or of a halogen. A very high energy laser can result.

13 Claims, 2 Drawing Sheets

EXIONIMER FORMATION: $3 H_2\uparrow + 2e^- \rightarrow 2 H_3^+ + 4e^-$ $H_3^+ + Cs \rightarrow H^*Cs + H$

IF NOT EXOTHERMIC, THEN $XH\uparrow + e^- \rightarrow XH^+ + 2e^-$ $XH^+ + Cs \rightarrow H^*Cs^* + X$ NOTE $H^+$ REACTS DIRECTLY WITH Cs MULTI-ELECTRON Cs ECP CAN BE USED FOR INNER CORE Cs⁺ EXCITATIONS.

EXIONIMER FORMATION: $3H_2 + 2e^- \longrightarrow 2H_3^+ + 4e^-$ $H_3^+ + Cs \longrightarrow H^+Cs + H$

IF NOT EXOTHERMIC, THEN $XH + e^- \longrightarrow XH^+ + 2e^-$ $XH^+ + Cs \longrightarrow H^+Cs^* + X$ NOTE $H^+$ REACTS DIRECTLY WITH Cs

AN EMBODIMENT:

LASING COMPOSITION

DESCRIPTION

1. Technical Field

The invention relates to a novel lasing composition, laser and method of producing laser energy.

2. Background Art

Conventional excimer lasers operate by generating an inverted population of excited species which are composed of neutral diatomic molecules stably bound together while in a higher electronic energy (an electronically excited) state but unbound when in a lower electronic energy state (generally the ground state). Since the ground state is unbound, the dimer dissociates rapidly, leading to ground state depletion for the lower lasing level and ensuring that members of the upper level can lase. Since the dimer exists only in an excited state, the name "excimer" (equivalent to excited dimer) is given to this type of molecule.

The atoms which are used in the formation of a coventional excimer are frequently combinations of a noble gas plus a halogen (e.g., XeCl). The energy levels of the excited upper state are located several electron volts (eV) above the lower dissociating state, producing laser outputs having a wavelength in the range of less than or equal to 200 nanometers (nm), typically. A large amount of pumping power, usually an electric discharge for an electron beam (E-beam), is used to drive a large excimer laser. Output power densities are high and efficiencies are typically a few percent. Radiative lifetimes for the excited upper state are relatively short and, hence, gain coefficients tend to be large compared to other types of lasers.

It would be highly desirable to provide lasing compositions, lasers and methods of lasing which can produce lasers with significantly higher energy photons (shorter wavelengths) than 200 nanometers). The excimers of the prior art are practically incapable of producing laser beams of such short wavelengths.

The present invention is directed to overcoming one or more of the problems as set forth above.

DISCLOSURE OF THE INVENTION

In accordance with an embodiment of the present invention a composition of matter is set forth which is capable of producing laser energy on being pumped and which comprises a first chemical entity and a second chemical entity, the first and second entities forming a charge bearing diatomic molecule when excited to a relatively higher energy state and existing as distinct non-associated entities when in a relatively lower energy state.

In accordance with another embodiment of the present invention a laser is set forth which comprises an enclosure having therein the just mentioned composition of matter and means for pumping the composition of matter to produce laser energy.

In accordance with still another embodiment of the present invention a method is set forth of producing laser energy which comprises exciting a mixture of the aforementioned composition of matter until a portion thereof is in the higher energy state.

Advantageously, the present invention provides a laser composition, a laser and a lasing method capable of producing significantly higher photon energies than are producible by prior art excimer lasers. Such ultrashigh photon energy lasers have the advantage of being useful for purposes for which conventional, lower energy, excimer lasers have insufficient power.

BRIEF DESCRIPTION OF DRAWING

The present invention will be better understood by reference to the $Cs^+$ example as illustrated in the figures of the drawings, wherein.

BEST MODE FOR CARRYING OUT THE INVENTION

The central innovation which forms the basis for the present invention is to use one or more ions in place of the neutral atoms which constitute conventional excimer combinations. It has been found that the feasibility of using ions in place of atoms to produce an ionized excimer (hereinafter referred to as an exionimer) depends on selecting ions which have an electronic structure similar to the constituents of a conventional excimer. This means that when in the ionic state, produced either by the removal or the addition of one or more electrons, the electronic structure of the ion should resemble either that of an inert gas or that of a halogen atom. A classic example of this is $Cs^+$ which has the electronic structure of xenon, but which carries a charge of $+1$. The advantage of using ions to form excimer-type lasers is that the charge on the atomic species leads to a greater separation in the energy levels (between the excited state and the ground state) and usually shorter wavelength, more energetic output photons in the laser beam. In addition, the concept embodies a whole new class of lasing media, which can be explored for a variety of applications.

Quantum mechanical calculations have been carried out which indicate that exionimer species will produce lasing systems with shorter wavelength output than has ever been achieved with excimer lasers. Depending on the combination of ions and atoms used, wavelengths ranging from 171 nm to 26 nm have been calculated.

Figure 1:
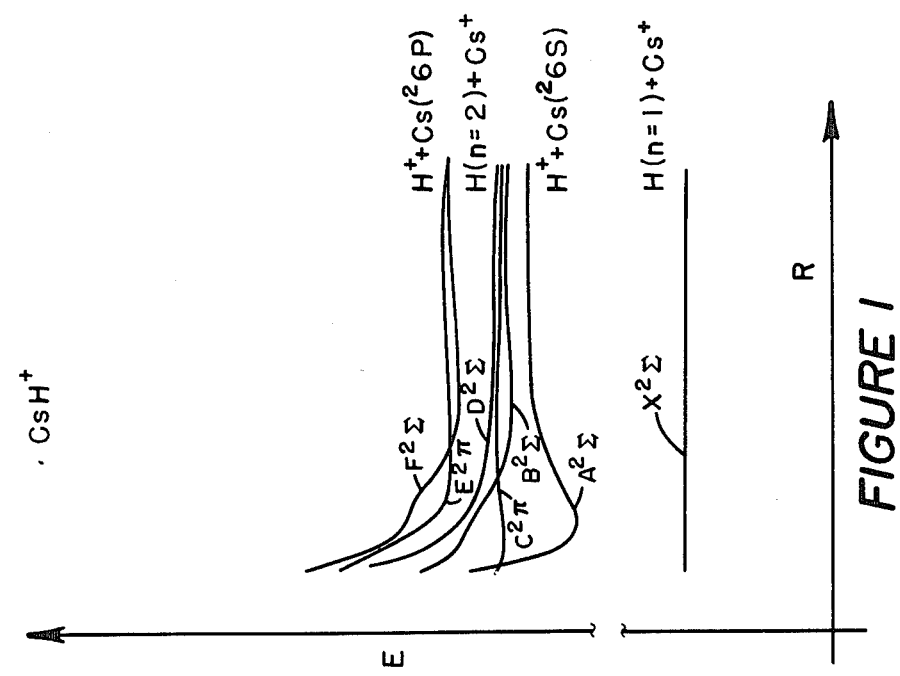
FIG. 1 illustrates the energy level system of an example system, which includes H atoms and $Cs^+$ ions in the lower energy state.

Detailed knowledge of the energy level structure for the exionimer combination $H+Cs^*$ exists as the result of complete quantum mechanical modeling of the system. FIG. 1 shows the energy levels obtained by the quantum mechanical modeling. A suitable energy level structure for this exionimer, lasing with an output wavelength of 141 nm, is shown. Semi-quantitative estimates of the output wavelength and characteristics of other such systems have been made for a variety of other combinations involving alkaline metals. The use of negative ion combinations has also been recognized and noted.

The threshold pumping power of the $H+Cs^*$ system is calculated to be approximately eight times less than the threshold pumping power of the well known KrF excimer. This relatively high energy efficiency is characteristic of these exionimer combinations; and, hence, the concept lends itself readily towards high energy lasers which may produce high energy directive beams.

Thus, in the broad sense the invention is in the nature of a combination of matter capable of producing laser energy on being pumped. Such composition of matter would comprise a first chemical entity and a second chemical entity. The first and second chemical entities form a charge bearing molecule when excited to a relatively higher energy state and exist as distinct non-dissociated entities when in a relatively lower energy state. In order to produce the laser energy the composition must be excited sufficiently as by pumping. It is particularly preferred that a respective one of the first and second entities in the charge bearing molecule has a number of outer shell electrons substantially equal to the number of outer shell electrons of a noble gas or of a halogen. Most preferably, the respective one of the first and second chemical entities in the charge bearing molecule is selected from the group consisting of He+, A+, Kr+, Xe+, He++, Ne++, A++, Kr++, Rn++, H+, Li+, Na+, K+, Rb+, Cs+, Fr+, Be++, Mg++, Ca++, Sr++, Ba++, Ra++, O−, S−, Se−, Te−, Po−, H−, F−, Cl−, Br− and I−. As will be noted in each of the examples herein the ionized member of the first and second entities in the charge bearing molecule typically has a number of outer shell electrons substantially equal to the number of outer shell electrons of a noble gas or of a halogen; that is, it is isoelectronic in its electron configuration to a noble gas or a halogen.

Laser energy is produced by exciting a mixture of the aforementioned first and second chemical entities until a portion thereof is in the higher energy state. Generally there are equal amounts of the first and second and second chemical entities and the charge bearing molecule is a diatomic molecule.

The first type of exionimer combination identified involves positive alkali ions and/or hydrogen atoms or ions. The analogy in electronic structure between an alkali metal ion and an inert gas exists in such systems. Furthermore, hydrogen requires one extra electron to form the closed helium shell so it can be considered to be analogous to a halogen. H+Cs* has been identified as an exionimer combination and is considered a model for many other combinations of atomic species of similar properties. Since the exionimer carries an electric charge due to the ionization, energy levels are spaced farther apart, as indicated by the equation:

$$E^n = -\frac{mZ^2e^4}{2n^2h^2}$$

As a result, very short wavelength lasers can be produced.

FIG. 1 shows energy levels of the CsH+ system. The $A^2\Sigma$ state shows a bound potential well as the upper energy state representative of a diatomic exionimer entity. The unbound $X^2\Sigma$ state represents a lower energy state and is almost totally flat—showing no evidence of a bound state and represents dissociated H(N=1) and Cs+.

Electric discharges may be used to form the exionimer upper state. Ionization by electron impact and recombination processes can lead to the production of the excited state. The following equations illustrate such schemes:

ELECTRON IMPACT IONIZATION $$e^- + Cs \rightarrow Cs^+ + 2e^-$$

-continued
$$e^- + Cs^+ \rightarrow Cs^{++} + 2e^-$$

3 BODY PROCESSES AFTER IONIZATION FORM EXCITED STATE $$e^- + Cs^{++} + H \rightarrow CsH^{+*} + e^-$$

$$Cs^{++} + H + e^- \rightarrow Cs^{++}H + e^-$$

$$Cs^+H^+ + 2e \rightarrow Cs^+H^* + e^-$$

Figure 3:
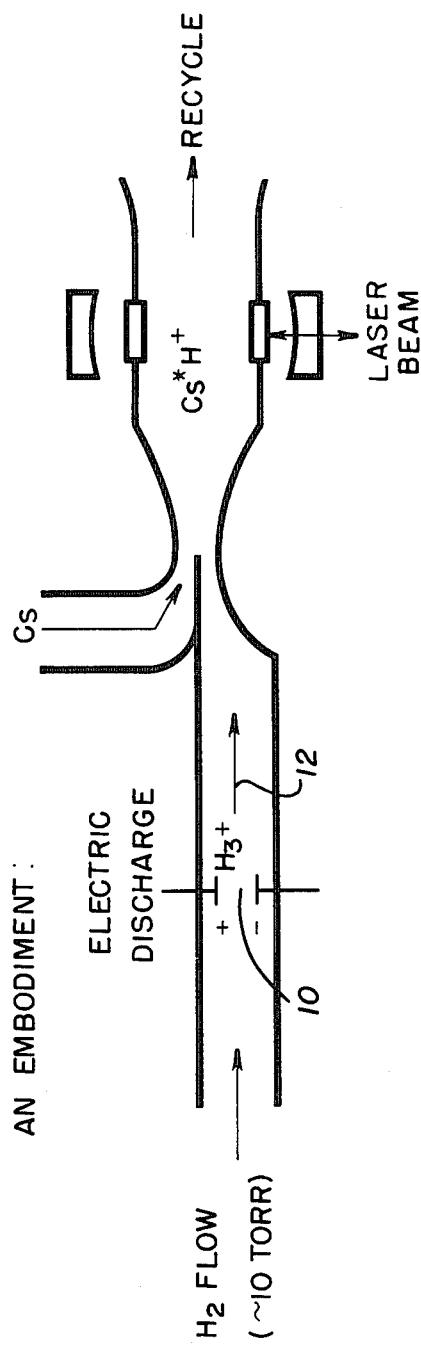
FIG. 3 illustrates a laser utilizing the H atom + $Cs^+$ ion system of FIG. 1.

An alternative approach to formation of the excited exionimer state may be through use of a hybrid system which embodies the characteristics of an electric discharge and those of a flowing chemical laser reaction. FIG. 3 illustrates such a system. If hydrogen gas passes through an electric discharge (at 10) at a pressure of approximately 10 Torr, a stable ionized species of $H_3^+$ is formed in the downstream plume 12. The $H_3^+$ can then be injected into an alkali metal vapor to produce the excited exionimer state.

The output laser energy of the H+Cs* system is precisely known from the quantum mechanical calculations of the energy levels previously discussed. It can also serve as a model for this class of exionimer possibilities. The energy level is estimated from the difference in the ionization potential between the hydrogen and cesium minus the dissociation energy which binds the upper state together. In the case of Cs+, the binding energy of this upper state is 0.94 eV leading to a laser output energy of slightly less than 9 eV. If other alkaline metals, which have a higher ionization potential are used, a less energetic output photon and a correspondingly longer wavelength would be produced. Conversely, if something other than hydrogen, with a higher ionization potential, is used, a shorter output wavelength will result. Estimates of systems using helium lead to very short wavelengths in the soft X-ray range.

Figure 2:
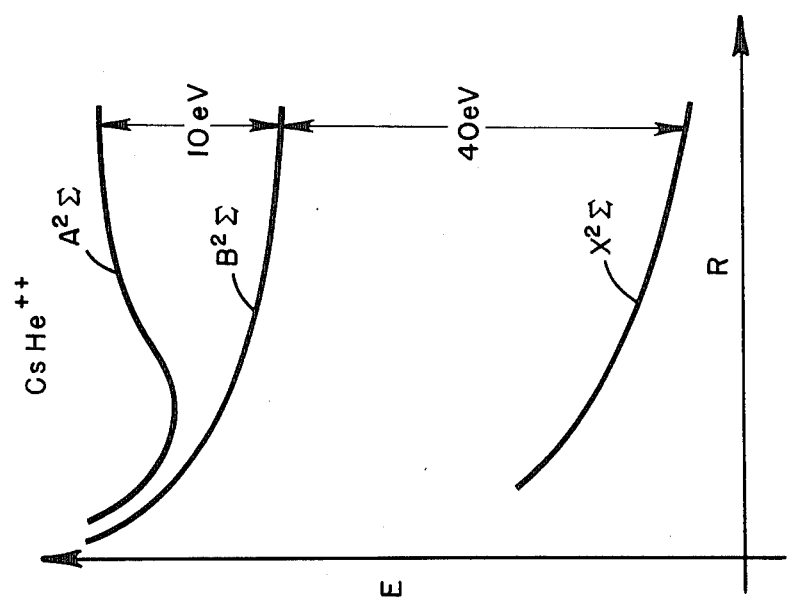
FIG. 2 similarly illustrates the energy levels of another variant of the system which includes $He^+ + Cs^+$ ions in the lower energy state.

FIG. 2 shows the energy levels of the CsHe++ system. As is noted the output wavelength is in excess of 40 eV. There is a difference in the energy level structure between that of CsHe++ and CsH+ (FIG. 1). In particular, the bound upper level of the exionimer is CsHe++ is not the first level above the ground state as it is in the hydrogen system. This energy level, labelled $A^2\Sigma$ on these two diagrams, would be the upper lasing level. In the helium system, however, there ae two possible lower levels ($B^2\Sigma$ and $X^2\Sigma$) which may produce a single laser output line or two simultaneous lines.

Both positive and negative ionized species can be used as analogs for inert gases or halogen. Removal of one electron from an alkali metal atom or two electrons from an alkali earth atom produces an inert gas core with an ionic charge. Conversely, addition of one electron to a halogen or addition of two electrons to a chalcogen (O,S,etc.) produces an inert gas core. If an electron is removed from an inert gas, the resulting electronic structure has one vacancy analogous to a halogen species. Similarly, if only one electron is added to a chalcogen (e.g., O−), this is also analogous to a halogen. Following these principles, it is possible to define many combinations which may be interesting exionimer candidates for laser systems. The following chart summarizes the useful atoms:

| Electronic State Of Outer Shell | | | | | | | | |
|---|---|---|---|---|---|---|---|---|
| Ae ≡ Alkali Earth | Be | Mg | Ca | Sr | Ba | 2 Electrons | $Ae^{++}$ | $Ae^+$ |
| A ≡ Alkali Metal | Li | Na | K | Rb | Cs | 1 Electron | $A^+$ | A |
| G ≡ Inert Gas | He | Ne | Ar | Kr | Xe | Filled | G | G |
| Ha ≡ Halogen | H | F | Cl | Br | I | 1 Vacancy | $Ha^-$ | Ha |
| Ch ≡ Chalcogen | | O | S | Se | Te | 2 Vacancies | $Ch^{--}$ | $Ch^-$ |
| H ≡ Hydrogen | | | | | | | | |

Example: $Cs^+$ is a Xe core
But the added charge in the $Cs^+$ nucleus leads to tighter binding - Higher energy transitions Examples of ionic analogs which can be combined in the form of the typical excimer used in lasers are shown in the following chart. These examples are limited to combinations of positive ions and neutral atoms. XeCl and KrF are used as models of a gas-halogen conventional excimer and the ionic species are picked to show the parallelism in the analogy. The abbreviations are identical to those in the previous chart.

| | FORM | EXAMPLES |
|---|---|---|
| CONVENTIONAL EXCIMER | GHa | XeCl |
| | | KrF |
| POSITIVE EXIONIMER | $A^+$Ha | $Cs^+Cl$ |
| | | $Rb^+F$ |
| | $Ae^{++}$Ha | $Ba^{++}Cl$ |
| | | $Sr^{++}F$ |
| | $GG^+$ | $XeAr^+$ |
| | | $KrNe^+$ |
| | $A^+G^+$ | $Cs^+Ar^+$ |
| | | $Rb^+Ne^+$ |

NOTE:
He is very tightly bound (S Shell only). Accordingly $HeHe^+$ should yield very short wave lengths.

Examples of negative ion species which form analogs of excimers are shown in the next chart. Both negative halogen and neutral halogen combinations, as well as negative halogen and negative chalcogen combinations are indicated as possible examples. Some of these combinations can make stable excited state exionimers which will produce upward wavelengths in the same region as the inert gas-halide neutral excimers.

| | FORM | EXAMPLE |
|---|---|---|
| CONVENTIONAL EXCIMER | GHa | XeCl |
| NEGATIVE EXIONIMER | $Ha^-$Ha | $I^-Cl$ |
| | | $Br^-F$ |
| | $Ha^-Ch^-$ | $I^-S^-$ |
| | | $Br^-O^-$ |

In addition to cesium, any of the other alkali metals can be used to form an exionimer combination with a bound upper state and an unbound lower state. The lighter alkali atoms have higher ionization potentials and, thus, produce laser outputs with lower energy than $CsH^{+*}$. The systems involving lithium, sodium and potassium are particularly interesting since these can operate in the range where optical materials are available in the present state-of-the-art. Conversely, cesium and rubidium systems have wavelengths beyond the range of presently available optics.

The required pumping power and other characteristics of the $CsH^+$ system have been estimated for comparison with the KrF excimer laser. This comparison shows that although upper state lifetime for the $CsH^+$ exionimer is only one-tenth of a nano-second, the very high stimulated emission cross-section leads to a higher gain. The threshold pumping power necessary to produce 0.1 cm$^{-1}$ linear gain is estimated to be only one-eighth as large as that for KrF. The saturation intensity is also larger for the $CsH^{+*}$ system. The following tables report this data.

| Materials | Laser Energy | | Level Characteristics | Comments |
|---|---|---|---|---|
| $He_2^+$ | 22 eV | 56 nm | 2 bound upper states; 1 bound lower state; and 1 repulsive lower state | |
| $LiHe^+$ | 17 eV | 73 nm | Bound upper states; unbound lower state | May be produced in thermonuclear explosion or nuclear fission pumped laser |
| $LiHe^{++}$ | 44 eV | 28 nm | Multiple upper states; with 1 bound state; repulsive lower state | Same as above |
| $CsHe^{++}$ | 48 eV | 26 nm | Bound upper state; unbound state | Level crossing with $He^+$ (N = 3) may cause predissociation problem |

Various combinations involving helium have been investigated semi-quantitatively to look at potential systems with very short wavelengths in the extreme ultraviolet (approaching soft X-rays). The helium dimer can exist as an ionized excimer. The systems using lithium may be particularly interesting since lithium deuteride is present in a thermonuclear reaction, and the fragments of a nuclear explosion could lead to a nuclear pumped laser. $LiHe^{++}$ could be created by irradiating lithium vapor with alpha particles. All of these systems operate in the range where no optics are presently available and, hence, perhaps only super-radiant, non-optically steered lasers could be made.

INDUSTRIAL APPLICABILITY

The present invention provides a new class of high energy lasers which may be utilized for a number of purposes. Furthermore, these lasers are made from readily available and generally relatively inexpensive materials.

We claim:

1. A composition of matter pumped to produce light amplification by stimulated emission, comprising: a first chemical entity, a second chemical entity, and a charge bearing molecule formed by said first and second chemical entities being pumped to a relatively higher energy state, said charge bearing molecule, as it transitions from said relatively higher energy state to a relatively lower energy state and forms distinct non-associated entities, produces stimulated emission of light in the process of transition to said relatively lower energy state.

2. A composition of matter as set forth in claim 1, wherein a respective one of said first chemical entity and said second chemical entity in said charge bearing molecule has a number of outer shell electrons substantially equal to the number of outer shell electrons of a noble gas or of a halogen.

3. A composition of matter as set forth in claim 2, wherein said respective one of said first chemical entity and said second chemical entity in said charge bearing molecule is selected form the group consisting of He+, A+, Kr+, Xe+, He++, Ne++, A++, Kr++, Rn++, H+, Li+, Na+, K+, Rb+, Cs+, Fr+, Be++, Mg++, Ca++, Sr++, Ba++, Ra++, O−, S−, Se−, Te−, Po−, H−, F−, Cl−, Br− and I−.

4. A composition of matter as set forth in claim 1, wherein said charge bearing molecule comprises a diatomic molecule.

5. A composition of matter as set forth in claim 1, wherein both said charge bearing molecule and an additional chemical entity are formed by said first and second chemical entities being pumped to said relatively higher energy state.

6. A method of producing laser energy, comprising: exciting a mixture of a first chemical entity and a second chemical entity, by pumping said mixture sufficiently to produce light amplification by stimulated emission wherein said first and second entities form a charge bearing molecule when excited by said pumping to a relatively higher energy state and transition to distinct non-associated entities when within a relatively lower energy state thereby producing said light amplification.

7. A method of producing laser energy as set forth in claim 6, wherein a respective one of said first chemical entity and said second chemical entity and said charge bearing molecule has a number of electrons substantially equal to the number of outer shell electrons of a noble gas or a halogen.

8. A method of producing laser energy as set forth in claim 7, wherein said respective one of said first chemical entity and said second chemical entity in said charge bearing molecule is selected from the group consisting of He+, A+, Kr+, Xe+, He++, Ne++, A++, Kr++, Rn++, H+, Li+, Na+, K+, Rb+, Cs+, Fr+, Be++, Mg++, Ca++, Sr++, Ba++, Ra++, O−, S−, Se−, Te−, Po−, H−, F−, Cl−, Br− and I−.

9. A method of producing laser energy as set forth in claim 6, wherein said charge bearing molecule comprises a diatomic molecule.

10. A laser comprising an enclosure having therein a first chemical entity and a second chemical entity, wherein said first chemical entity and said second chemical entity form a charge bearing molecule when excited to a relatively higher energy state and exist as distinct non-associated entities when in a relatively lower energy state; and means for pumping sufficient energy into said enclosure whereby laser energy is produced by the dissociation of said charge bearing molecule into said distinct non-associated entities.

11. A laser as set forth in claim 10, wherein a respective one of said first chemical entity and said second chemical entity in said charge bearing molecule has a number of outer shell electrons substantially equal to the number of outer shell electrons of a noble gas or a halogen.

12. A laser set forth in claim 10, wherein said respective one of said first chemical entity and said second chemical entity in said charge bearing molecule is selected from the group consisting of He+, A+, Kr+, Xe+, He++, Ne++, A++, Kr++, Rn++, H+, Li+, Na+, K+, Rb+, Cs+, Fr+, Be++, Mg++, Ca++, Sr++, Ba++, Ra++, O−, S−, Se−, Te−, Po−, H−, F−, Cl−, Br− and I−.

13. A laser as set forth in claim 10, wherein said charge bearing molecule comprises a diatomic molecule.

* * * * *